United States Patent
Chen et al.

(10) Patent No.: US 11,246,301 B2
(45) Date of Patent: Feb. 15, 2022

(54) COMPENSATORY MAGNETIC BRAKE STRUCTURE, LOW-PROFILE REEL, AND FISHING TACKLE

(71) Applicant: SHENZHEN BOSAIDONG TECHNOLOGY CO., LTD., Shenzhen (CN)

(72) Inventors: Hong Chen, Shangrao (CN); Yingdong Qi, Guangzhou (CN)

(73) Assignee: SHENZHEN BOSAIDONG TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/896,260

(22) Filed: Jun. 9, 2020

(65) Prior Publication Data

US 2021/0329898 A1    Oct. 28, 2021

(30) Foreign Application Priority Data

Apr. 24, 2020 (CN) .......................... 202010335255.9

(51) Int. Cl.
*A01K 89/01* (2006.01)
*A01K 89/033* (2006.01)

(52) U.S. Cl.
CPC .......... *A01K 89/056* (2015.05); *A01K 89/047* (2015.05)

(58) Field of Classification Search
CPC .............. A01K 89/033; A01K 89/0155; A01K 89/01555; A01K 89/01557
See application file for complete search history.

(56) References Cited

U.S. PATENT DOCUMENTS

| | | | | | |
|---|---|---|---|---|---|
| 5,692,693 | A | * | 12/1997 | Yamaguchi | A01K 89/01555 242/288 |
| 5,996,921 | A | * | 12/1999 | Hogaki | A01K 89/0155 182/239 |
| 6,086,005 | A | * | 7/2000 | Kobayashi | A01K 89/01555 242/288 |
| 6,126,105 | A | * | 10/2000 | Yamaguchi | A01K 89/01555 242/288 |
| 2009/0026300 | A1 | * | 1/2009 | Tsutsumi | A01K 89/01555 242/288 |
| 2009/0127367 | A1 | * | 5/2009 | Tsutsumi | A01K 89/01555 242/286 |
| 2009/0277985 | A1 | * | 11/2009 | Hyun | A01K 89/0155 242/286 |
| 2011/0073697 | A1 | * | 3/2011 | Koh | A01K 89/01555 242/288 |

* cited by examiner

*Primary Examiner* — Emmanuel M Marcelo

(57) ABSTRACT

A compensatory magnetic brake structure includes a line reel rotatably, a fixed magnet fixedly provided on a side of the line reel, a moving magnet rotatably provided on a side of the fixed magnet, an adjusting assembly for driving the moving magnet to rotate in order to adjust the corresponding range of a magnetic pole between the moving magnet and the fixed magnet, at least one set of magnetic piece movably provided between the moving magnet and the fixed magnet, and a centrifugal assembly automatically adjusting the distance between the magnetic piece and the axis of the line reel according to the speed of the line reel. The disclosure provides a compensatory magnetic brake structure with good brake stability and automatically compensatory brake function.

20 Claims, 2 Drawing Sheets

COMPENSATORY MAGNETIC BRAKE STRUCTURE, LOW-PROFILE REEL, AND FISHING TACKLE

TECHNICAL FIELD OF THE INVENTION

The disclosure relates to the field of fishing tackle, in particular, relates to a compensatory magnetic brake structure, a low-profile reel, and a fishing tackle.

BACKGROUND OF THE INVENTION

The magnet in the magnetic brake structure of the low-profile reel in the art is a universal "magnet buckle" in the industry, and the installation method of several planes, pole dislocation, interval is used to assembly. The type of brake structure has a poor magnetic stability produced by rotating spool to cut magnetic lines of force, cannot control the fishing vessel casting, and is vulnerable to the phenomenon of backlash. Moreover, the magnetic brake structure of the low-profile reel in the art cannot automatically compensate the braking force according to the speed of the line reel.

Therefore, the low-profile reel in the art at least has a poor magnetic brake stability, and not an automatic compensatory brake function and so on.

SUMMARY OF THE INVENTION

The purpose of the disclosure is to provide a compensatory magnetic brake structure, which is intended to solve the problems raised in the background of the invention.

The embodiment of the disclosure is implemented in this way, a compensatory magnetic brake structure includes a line reel rotatably, further includes:

a stationary magnet fixedly disposed on a side of the line reel;

a movable magnet rotatably disposed on a side of the stationary magnet;

an adjusting assembly for driving the movable magnet to rotate in order to adjust a corresponding range of magnetic poles between the movable magnet and the stationary magnet;

a set of at least one magnetic piece movably arranged between the movable magnet and the stationary magnet; and a centrifugal assembly automatically adjusting the distance between the at least one magnetic piece and the axis of the line reel depending on a speed of the line reel, and driving the at least one magnetic piece rotate to cut the magnetic lines of force between the movable magnet and the stationary magnet to produce a magnetic induction force opposite to the moving direction of the line reel when the line reel is rotating.

Further, the centrifugal assembly comprises:

a magnetic piece seat connected with the line reel for supporting the at least one magnetic piece; and a set of at least one elastic piece corresponding to the at least one magnetic piece, wherein the at least one magnetic piece is movably arranged on the at least one magnetic piece seat by the at least one elastic piece.

Further, the elastic force direction of the at least one elastic piece is perpendicular to the axis of the line reel.

Further, the at least one magnetic piece and the at least one elastic piece are each provided in a group of, wherein both the group of four magnetic pieces and the group of four elastic pieces are circularly distributed around the magnetic piece seat.

Further, the adjusting assembly comprises:

an adjusting gear arranged on a side of the movable magnet;

a magnetic force adjusting knob connected to the adjusting gear for driving the adjusting gear to rotate;

a transitional gear engaged with the adjusting gear; and a movable magnet base provided on a side of the stationary magnet for supporting the movable magnet, the movable magnet is provided on the movable magnet base, and the movable magnet base is provided with an inner tooth ring engaged with the transitional gear.

Further, the movable magnet and the stationary magnet are each of a ring structure, the axis of the movable magnet is coincident with that of the stationary magnet.

Further, the magnetic pole of the movable magnet is opposite to that of the stationary magnet.

Further, the inner tooth ring is of a semi-ring structure.

The embodiment of the disclosure further provides a low-profile reel including a fishing vessel body, and the compensatory magnetic brake structure.

The embodiment of the disclosure further provides a fishing tackle including the low-profile reel.

The embodiment of the disclosure provides a compensatory magnetic brake structure with good brake stability and automatic compensatory braking function. Through the at least one magnetic piece, movable magnet and stationary magnet, the rotation of the line reel could be used to make the movable magnet cut the magnetic lines of force between the movable magnet and the stationary magnet in order to produce the magnetic induction force opposite to the moving direction of the line reel for the purpose of stabilizing the brake. In addition, the embodiments of the disclosure can automatically adjust the centrifugal position of the at least one magnetic piece, depending on the speed of the line reel through the centrifugal assembly, to realize the automatic compensation braking function for avoiding the phenomenon of backlash of the low-profile reel. At the same time, the embodiments of the present invention can further adjust the corresponding range of the magnetic poles between the movable magnet and the stationary magnet by the adjusting assembly to change the number of magnetic lines of force between the movable magnet and the stationary magnet, thereby adjusting the magnitude of the magnetic induction force produced by the at least one magnetic piece cutting magnetic lines of force between the movable magnet and the stationary magnet, so as to achieve the purpose of adjusting the magnitude of the braking force.

Figure 1:
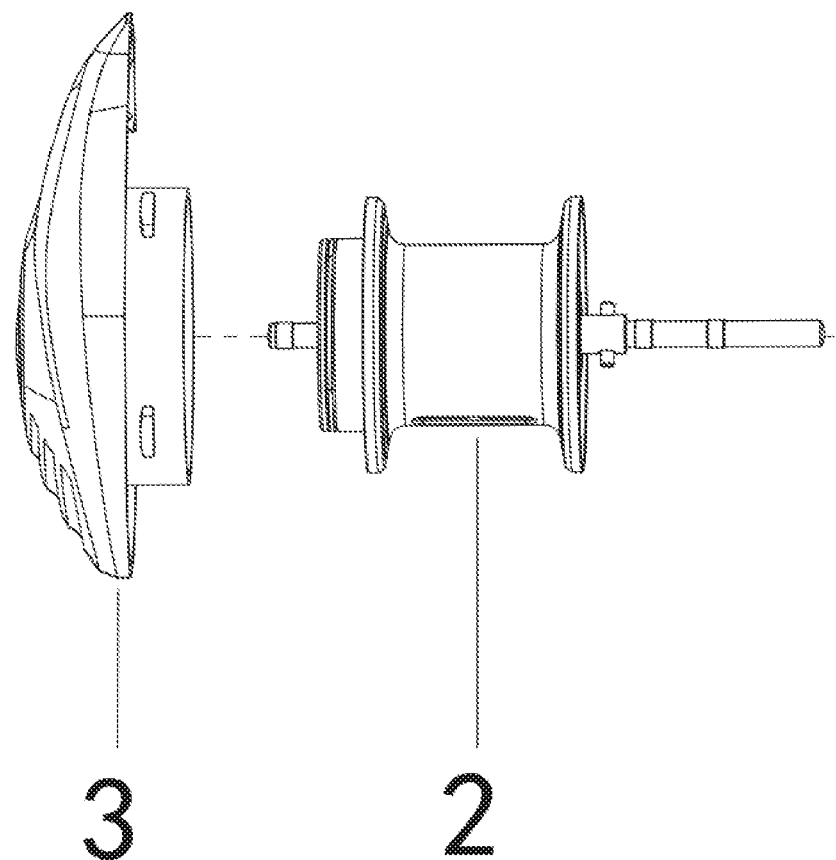
FIG. 1 is an explosive diagram of a compensatory magnetic brake structure provided by an embodiment of the disclosure.

Reference Numerals: 1—fishing vessel body, 2—line reel body, 21—fixing cover, 22—magnetic piece, 23—elastic piece, 24—magnetic piece seat, 25—spring locating disc, 26—first fastening screw, 27—line reel, 3—side cover body, 31—magnetic force adjusting knob, 32—side cover, 33—adjusting gear, 34—second fastening screw, 35—transitional gear, 36—third fastening screw, 37—line reel disc, 38—fourth fastening screw, 39—movable magnet seat, 40—movable magnet, 41—stationary magnet, 42—stationary magnet seat, 43—fifth fastening screw.

DETAILED DESCRIPTION OF THE EMBODIMENTS

In order to make the purpose, technical solution and advantages of the disclosure more clearly, the disclosure, combined with drawings and embodiments, will be further detailed. It should be understood that the specific embodiments described herein are intended only to explain the disclosure and are not intended to qualify the disclosure.

In addition, in the description of the application, the terminology used should be understood in a broad sense, and for the technical staff in the field, the specific meaning of the term may be understood in the context of the actual circumstances. For example, the terms "provide" and "arrange" used in this application may be defined as contact settings or contactless settings, etc., and the azimuth terms used are based on reference sits or in the direction defined by the actual situation and common sense.

Figure 2:
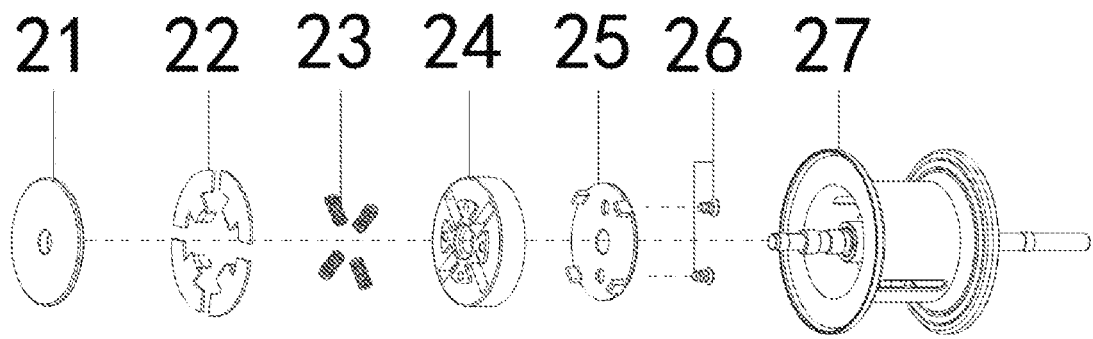
FIG. 2 is an explosive diagram of a line reel body provided by an embodiment of the disclosure.
Figure 3:
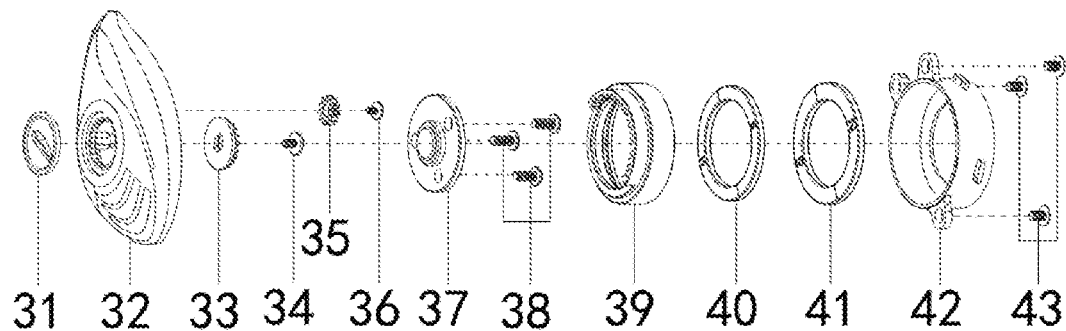
FIG. 3 is an explosive diagram of a side cover body provided by an embodiment of the disclosure.

As shown in FIGS. 1 to 3, in an embodiment of the disclosure, a compensatory magnetic brake structure is provided, which includes:

a line reel 27 rotatably disposed, further includes:

a stationary magnet 41 fixedly disposed on a side of the line reel 27;

a movable magnet rotatably disposed on a side of the stationary magnet 41;

an adjusting assembly for driving the movable magnet to rotate in order to adjust the corresponding range of a magnetic pole between the movable magnet and the stationary magnet 41;

a set of at least one magnetic piece 22 movably provided between the movable magnet and the stationary magnet 41;

a centrifugal assembly automatically adjusting the distance between the at least one magnetic piece 22 and the axis of the line reel 27 depending on the speed of the line reel 27, and making the at least one magnetic piece 22 rotate for cutting the magnetic lines of force between the movable magnet and the stationary magnet 41 to produce a magnetic induction force opposite to the moving direction of the line reel 27 when the line reel 27 is rotating.

In practical application, the compensatory magnetic brake structure could be a brake structure of a low-profile reel, which consists of the line reel body 2 and the side cover body 3. Wherein, the line reel body 2 includes the line reel 27, the at least one magnetic piece 22, and the centrifugal assembly, the side cover body 3 includes the movable magnets, the stationary magnet 41, and the adjusting assembly.

Due to the at least one magnetic piece 22, the movable magnet, and the stationary magnet 41, the embodiment of the disclosure can drive the magnetic force 22 to rotate for cutting the magnetic lines of force between the movable magnet and the stationary magnet 41 through the rotation of the line reel 27, in order to produce the magnetic induction force in the opposite direction of the line reel 27, thus achieving the purpose of stabilizing the brakes. In addition, the embodiment of the disclosure can automatically adjust the centrifugal position of the at least one magnetic piece 22 according to the speed of the line reel 27, in order to achieve automatic compensatory brake function, thus avoiding the phenomenon of the low-profile reel backlash. At the same time, the embodiment of the disclosure can also adjust the corresponding range of the magnetic poles between the movable magnet and the stationary magnet 41 by the adjusting assembly to change the number of magnetic lines of force between the movable magnet and the stationary magnet 41, so as to adjust the magnetic induction force produced by the magnet piece 22 cutting the magnetic lines of force between the movable magnet and the stationary magnet 41, thereby achieving the purpose of adjusting the braking force.

As shown in FIG. 2, as a preferred solution for the embodiment of the disclosure, the centrifugal assembly includes:

a magnetic piece seat 24 connected with the line reel 27 for supporting the at least one magnetic piece 22;

a set of at least one elastic piece corresponding to the at least one magnetic piece 22, and movably arranged on the magnetic piece seat 24 through the at least one elastic piece.

Wherein, the at least one magnetic piece 22 and the at least one elastic piece could each come in a group of four, namely there may be provided a group of four such magnetic pieces 22 and a group of four such elastic pieces 23, but the present disclosure will not be limited to this. Both the group of four magnetic pieces 22 and the group of four elastic pieces 23 are circularly distributed on the magnetic piece seat 24. The elastic force direction of the at least one elastic piece is perpendicular to the axis of the line reel 27.

Specifically, the magnetic piece seat 24 is connected to the axis of the line reel 27, the magnetic piece seat 24 could be driven to rotate synchronously when the line reel 27 is rotating. A group of four chutes could be provided along the radius direction of the magnetic piece seat 24. Each elastic piece could be a spring, which could be provided in the corresponding chute. The at least one magnetic piece 22 is of a piece structure, one end thereof is connected to one end of the elastic piece and is located in the chute. In addition, the two sides of the magnetic piece seat 24 are respectively fixed with a fixing cover 21 and a spring locating disc 25 through a group of several first fastening screws 26, the at least one magnetic piece 22 is movably arranged between the fixing cover 21 and the magnetic piece seat 24. Four protrusions are provided on the spring locating disc 25, four protrusions are located in a set of four chutes respectively, and the other end of the elastic piece is connected with the corresponding protrusion. When the line reel 27 rapidly rotates with the fish line, the magnetic piece seat 24 will be driven to rotate so that the at least one magnetic piece 22 on the magnetic piece seat 24 is thrown away from the magnetic piece seat 24 under the impact of the centrifugal force. With speed change of the line reel 27 and the magnetic piece seat 24, the centrifugal force of the at least one magnetic piece 22 will change accordingly, the thrown-away distance thereof will change accordingly, thereby the purpose of automatically adjusting the position of the at least one magnetic piece 22 according to the speed of the line reel 27 could be realized.

As shown in FIG. 3, as another preferred solution of the embodiment of the disclosure, the adjusting assembly includes:

an adjusting gear 33 provided on a side of the movable magnet;

a magnetic force adjusting knob 31 connected to the adjusting gear 33 for driving the adjusting gear 33 to rotate;

a transitional gear 35 engaged with the adjusting gear 33;

a movable magnet base provided on a side of the stationary magnet 41 for supporting the movable magnet, the movable magnet is provided on the movable magnet base, and the movable magnet base is provided with an inner tooth ring engaged with the transitional gear 35.

Specifically, the magnetic force adjusting knob 31 is rotatably provided on the side cover 32, the side cover 32 could be fixed on the fishing vessel body of the low-profile reel. The adjusting gear 33 could be connected with the magnetic force adjusting knob 31 by a second fastening screw 34. The transitional gear 35 could be mounted on a pin shaft by a third fastening screw 36, and then be rotatably mounted on the side cover 32 by the pin shaft. Further, the side cover 32 is fixedly provided with a reel shaft plate 37, the reel shaft plate 37 is rotatably connected with a shaft of the line reel 27. In addition, the side cover 32 is fixedly provided with a stationary magnet seat 42 with cylinder-shape through a fifth fastening screw 43, the stationary magnet 41 is fixedly mounted in the stationary magnet seat 42, the movable magnet seat is rotatably provided in the stationary magnet seat 42. The magnet seat 24 pass through the stationary magnet seat 42 and the magnet 41, so that the at least one magnetic piece 22 is located between the movable magnet and stationary magnet 41.

When the braking force needs to be adjusted, the magnetic force adjusting knob 31 can be rotated to drive the magnetic adjusting gear 33 to rotate. The rotation of the adjusting gear 33 can make the transitional gear 35 rotate, the rotation of the transitional gear 35 can make the movable magnet base rotate, the rotation of the movable magnet seat can make the movable magnet rotate. Therefore, the corresponding magnetic pole range between the movable magnet and stationary magnet 41 is changed, and the number of magnetic lines of force between the movable magnet and stationary magnet 41 is changed. Thus, the size of the magnetic induction force produced by cutting the magnetic lines of force between the movable magnet and the stationary magnet 41 could be adjusted for adjusting the size of the braking force.

As shown in FIG. 3, as another preferred solution of the embodiment of the disclosure, the movable magnet and the stationary magnet 41 are ring structures, the axis of the movable magnet is coincident with that of the stationary magnet 41. The pole of the movable magnet is opposite to that of the stationary magnet 41. The inner tooth ring is a semi-ring structure.

Specifically, the movable magnet and stationary magnet 41 could be the same of the structure and specifications, which can be composed of an arc-shaped S-pole and an arc N-pole. Wherein, the S-pole of the movable magnet is opposite to the N-pole of the stationary magnet 41, the N-pole of the movable magnet is opposite to the S-pole of the stationary magnet 41, thereby ensuring the presence of magnetic induction lines between the movable magnet and the stationary magnet 41. In addition, the rotation angle of the movable magnet can be restricted within 180 degrees by the inner tooth ring with the semi-ring structure provided on the movable magnet base.

Figure 4:
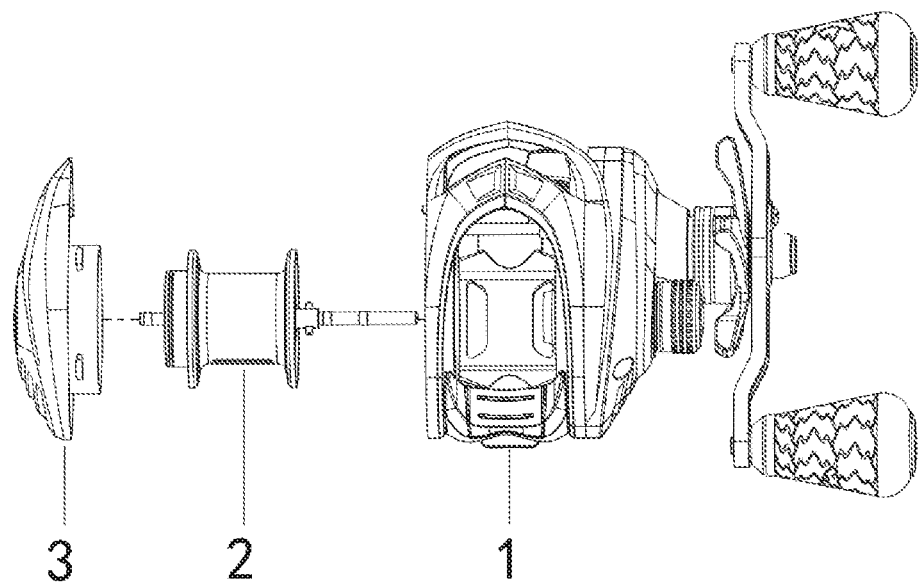
FIG. 4 is an explosive diagram of a low-profile reel provided by an embodiment of the disclosure.

As shown in FIG. 4, in another embodiment of the disclosure, a low-profile reel is further provided, which includes the fishing vessel body 1 and the compensatory magnetic brake structure.

Specifically, the structure of the low-profile reel can be composed of three parts: the fishing vessel body 1, the line reel body 2, and the side cover body 3. The structure of the line reel body 2 and the side cover body 3 is the same as the structure of the above embodiment, the structure of the fishing vessel body 1 may be the same as the structure of the low-profile reel in the art. The line reel body 2 could be assembled inside the fishing vessel body 1, the side cover body 3 could be connected with the fishing vessel body 1, so that the line reel body 2 is located between the fishing vessel body 1 and the side cover body 3.

In another embodiment of the disclosure, a fishing tackle is further provided, which includes the above-mentioned low-profile reel.

Specifically, the structure of the low-profile reel is only different between the structure of the fishing tackle and the structure of the fishing tackle in the art, other structures of the fishing tackle could be the same as the structure of the fishing tackle in the art, for example, with a fishing rod, a fishing line, etc., it's not described here.

In summary, the embodiment of the disclosure provides the fishing tackle and the low-profile reel in use. When the fishing vessel body 1 is used to cast bait, the line reel 27 will rapidly rotate with the fish line. At this time, the at least one magnetic piece 22 will be thrown away from the magnetic piece seat 24 under the impact of the centrifugal force, and will rotate between the movable magnet and stationary magnet 41 to cut the magnetic lines of force so as to produce a magnetic force opposite to the rotation direction of line reel 27 for automatically compensating the braking. In addition, when the braking force of the low-profile reel needs to be adjusted according to the actual demand, the corresponding range of magnetic pole between the movable magnet and the stationary magnet 41 can be adjusted by rotating the magnetic force adjusting knob 31 to change the amount of magnetic lines of force between the two magnets for adjusting the magnitude of magnetic induction force produced by the at least one magnetic piece 22 cutting magnetic lines of force between the movable magnet and the stationary magnet 41, and finally achieve the purpose of adjusting the magnitude of the braking force.

The embodiments described above represent only a few embodiments of the disclosure, its description is more specific and detailed, but cannot be understood as a limitation on the scope of the patent of the disclosure. It should be pointed out that for ordinary technical personnel in the art, without departing from the concept of the disclosure, you can also make a number of deformations and improvements, these are the scope of protection of the disclosure. Therefore, the scope of protection of the patent of the disclosure shall be subject to the attached claim.

What is claimed is:

1. A compensatory magnetic brake structure comprising a rotatable line reel, further comprising
    a stationary magnet fixedly disposed on a side of the line reel;
    a movable magnet rotatably disposed on a side of the stationary magnet;
    an adjusting assembly configured for driving the movable magnet to rotate in order to adjust a corresponding range of magnetic poles between the movable magnet and the stationary magnet;
    a set of at least one magnetic piece movably arranged between the movable magnet and the stationary magnet; and
    a centrifugal assembly configured for automatically adjusting a distance between the at least one magnetic piece and an axis of the line reel depending on a speed of the line reel, and driving the at least one magnetic piece to rotate to cut magnetic lines of force between the movable magnet and the stationary magnet to produce a magnetic induction force opposite to a moving direction of the line reel when the line reel is rotating.

2. The compensatory magnetic brake structure according to claim 1, wherein the centrifugal assembly comprises a magnetic piece seat connected with the line reel and configured for supporting the at least one magnetic piece; and a set of at least one elastic piece corresponding to the at least one magnetic piece, wherein the at least one magnetic piece is movably arranged on the magnetic piece seat through the at least one elastic piece.

3. The compensatory magnetic brake structure according to claim 2, wherein an elastic force direction of the at least one elastic piece is perpendicular to the axis of the line reel.

4. The compensatory magnetic brake structure according to claim 2, wherein the at least one magnetic piece and the at least one elastic piece are each provided in a group of four, wherein both the group of four magnetic pieces and the group of four elastic pieces are circularly distributed around the magnetic piece seat.

5. The compensatory magnetic brake structure according to claim 1, wherein the adjusting assembly comprises
- an adjusting gear arranged on a side of the movable magnet;
- a magnetic force adjusting knob connected to the adjusting gear and configured for driving the adjusting gear to rotate;
- a transitional gear engaged with the adjusting gear; and
- a movable magnet base provided on a side of the stationary magnet and configured for supporting the movable magnet, wherein the movable magnet is arranged on the movable magnet base, and the movable magnet base is provided with an inner tooth ring engaged with the transitional gear.

6. The compensatory magnetic brake structure according to claim 5, wherein the movable magnet and the stationary magnet are each of a ring structure, an axis of the movable magnet is coincident with that of the stationary magnet.

7. The compensatory magnetic brake structure according to claim 6, wherein a magnetic pole of the movable magnet is opposite to that of the stationary magnet.

8. The compensatory magnetic brake structure according to claim 7, wherein the inner tooth ring is of a semi-ring structure.

9. A low-profile reel, comprising a fishing vessel body and a compensatory magnetic brake structure; wherein the compensatory magnetic brake structure comprises a rotatable line reel, and further comprises:
- a stationary magnet fixedly disposed on a side of the line reel;
- a movable magnet rotatably disposed on a side of the stationary magnet;
- an adjusting assembly configured for driving the movable magnet to rotate in order to adjust a corresponding range of magnetic poles between the movable magnet and the stationary magnet;
- a set of at least one magnetic piece movably arranged between the movable magnet and the stationary magnet; and
- a centrifugal assembly configured for automatically adjusting a distance between the at least one magnetic piece and an axis of the line reel depending on a speed of the line reel, and driving the at least one magnetic piece to rotate to cut magnetic lines of force between the movable magnet and the stationary magnet to produce a magnetic induction force opposite to a moving direction of the line reel when the line reel is rotating.

10. The low-profile reel according to claim 9, wherein the centrifugal assembly comprises a magnetic piece seat connected with the line reel and configured for supporting the at least one magnetic piece; and a set of at least one elastic piece corresponding to the at least one magnetic piece, wherein the at least one magnetic piece is movably arranged on the magnetic piece seat through the at least one elastic piece.

11. The low-profile reel according to claim 10, wherein an elastic force direction of the at least one elastic piece is perpendicular to the axis of the line reel.

12. The low-profile reel according to claim 10, wherein the at least one magnetic piece and the at least one elastic piece are each provided in a group of four, wherein both the group of four magnetic pieces and the group of four elastic pieces are circularly distributed around the magnetic piece seat.

13. The low-profile reel according to claim 9, wherein the adjusting assembly comprises
- an adjusting gear arranged on a side of the movable magnet;
- a magnetic force adjusting knob connected to the adjusting gear and configured for driving the adjusting gear to rotate;
- a transitional gear engaged with the adjusting gear; and
- a movable magnet base provided on a side of the stationary magnet and configured for supporting the movable magnet, wherein the movable magnet is arranged on the movable magnet base, and the movable magnet base is provided with an inner tooth ring engaged with the transitional gear.

14. The low-profile reel according to claim 13, wherein the movable magnet and the stationary magnet are each of a ring structure, an axis of the movable magnet is coincident with that of the stationary magnet.

15. The low-profile reel according to claim 14, wherein a magnetic pole of the movable magnet is opposite to that of the stationary magnet.

16. The low-profile reel according to claim 15, wherein the inner tooth ring is of a semi-ring structure.

17. A fishing tackle, comprising a low-profile reel; wherein the low-profile reel comprises a fishing vessel body and a compensatory magnetic brake structure; the compensatory magnetic brake structure comprises a rotatable line reel, and further comprises:
- a stationary magnet fixedly disposed on a side of the line reel;
- a movable magnet rotatably disposed on a side of the stationary magnet;
- an adjusting assembly configured for driving the movable magnet to rotate in order to adjust a corresponding range of magnetic poles between the movable magnet and the stationary magnet;
- a set of at least one magnetic piece movably arranged between the movable magnet and the stationary magnet; and
- a centrifugal assembly configured for automatically adjusting a distance between the at least one magnetic piece and an axis of the line reel depending on a speed of the line reel, and driving the at least one magnetic piece to rotate to cut magnetic lines of force between the movable magnet and the stationary magnet to produce a magnetic induction force opposite to a moving direction of the line reel when the line reel is rotating.

18. The fishing tackle according to claim 17, wherein the centrifugal assembly comprises a magnetic piece seat connected with the line reel and configured for supporting the at least one magnetic piece; and a set of at least one elastic piece corresponding to the at least one magnetic piece, wherein the at least one magnetic piece is movably arranged on the magnetic piece seat through the at least one elastic piece.

19. The fishing tackle according to claim 18, wherein an elastic force direction of the at least one elastic piece is perpendicular to the axis of the line reel.

20. The fishing tackle according to claim 19, wherein wherein the at least one magnetic piece and the at least one elastic piece are each provided in a group of four, wherein both the group of four magnetic pieces and the group of four elastic pieces are circularly distributed around the magnetic piece seat.

\* \* \* \* \*